(12) United States Patent
Masson et al.

(10) Patent No.: US 8,970,210 B2
(45) Date of Patent: Mar. 3, 2015

(54) BIDIRECTIONAL MAGNETIC POSITION SENSOR HAVING FIELD ROTATION

(75) Inventors: Gérald Masson, Besançon (FR); Thierry Dorge, Arc et Senans (FR)

(73) Assignee: Moving Magnet Technologies (MMT), Besancon (FR)

( * ) Notice: Subject to any disclaimer, the term of this patent is extended or adjusted under 35 U.S.C. 154(b) by 239 days.

(21) Appl. No.: 13/508,162

(22) PCT Filed: Oct. 28, 2010

(86) PCT No.: PCT/FR2010/052320
§ 371 (c)(1),
(2), (4) Date: Jun. 28, 2012

(87) PCT Pub. No.: WO2011/055064
PCT Pub. Date: May 12, 2011

(65) Prior Publication Data
US 2012/0262162 A1    Oct. 18, 2012

(30) Foreign Application Priority Data
Nov. 6, 2009  (FR) .................................... 09 05356

(51) Int. Cl.
*G01B 7/30*    (2006.01)
*G01D 5/14*    (2006.01)

(52) U.S. Cl.
CPC ...................................... *G01D 5/145* (2013.01)
USPC .............. 324/207.25; 324/207.2; 324/207.11; 324/207.21; 324/207.24

(58) Field of Classification Search
CPC ........... G01B 7/14; G01B 7/30; G01B 21/047
USPC ............... 324/207.2–207.25, 207.11, 207.13; 702/145–147, 150–151
See application file for complete search history.

(56) References Cited

U.S. PATENT DOCUMENTS

| | | | |
|---|---|---|---|
| 3,061,771 A | 10/1962 | Planer et al. | |
| 4,639,667 A | 1/1987 | Andresen | |

(Continued)

FOREIGN PATENT DOCUMENTS

| | | |
|---|---|---|
| CN | 101384883 | 3/2009 |
| DE | 102 39 904 | 3/2004 |

(Continued)

*Primary Examiner* — Arleen M Vazquez
*Assistant Examiner* — Neel Shah
(74) *Attorney, Agent, or Firm* — Harness, Dickey & Pierce, P.L.C.

(57) ABSTRACT

The disclosure relates to a magnetic position sensor in at least two directions, the sensor including at least one magnetized element and a probe including at least two magneto-sensitive elements located substantially on the same point and each measuring one of the components of the magnetic field generated by the magnetized element, the magnetized element being movable relative to the magneto-sensitive elements. The probe includes at least one processing circuit capable of carrying out angle and module calculations on the basis of algebraic combinations of the components of the magnetic field and providing at least two independent signals representing the position of the movable element along, respectively, one and the other of the two directions. According to the disclosure, the magnetization vector of the magnetized element is variable in relation to the normal vector on the surface of the magnetized element that is placed opposite the probe in at least one of the dimensions of the magnetized element so as to define a single position of the probe in relation to the magnetized element.

20 Claims, 11 Drawing Sheets

(56) References Cited

U.S. PATENT DOCUMENTS

| | | | |
|---|---|---|---|
| 4,785,242 A | 11/1988 | Vaidya et al. | |
| 4,966,041 A | 10/1990 | Miyazaki | |
| 5,070,298 A | 12/1991 | Honda et al. | |
| 5,159,268 A | 10/1992 | Wu | |
| 5,200,747 A | 4/1993 | Betz et al. | |
| 5,250,925 A | 10/1993 | Shinkle | |
| 5,351,387 A | 10/1994 | Iwata et al. | |
| 5,416,410 A | 5/1995 | Kastler | |
| 5,444,313 A | 8/1995 | Oudet | |
| 5,528,139 A | 6/1996 | Oudet et al. | |
| 5,532,585 A | 7/1996 | Oudet et al. | |
| 5,670,876 A | 9/1997 | Dilger et al. | |
| 5,781,005 A | 7/1998 | Vig et al. | |
| 5,814,985 A | 9/1998 | Oudet | |
| 5,930,905 A | 8/1999 | Zabler et al. | |
| 5,942,895 A | 8/1999 | Popovic et al. | |
| 6,043,645 A | 3/2000 | Oudet et al. | |
| 6,043,646 A | 3/2000 | Jansseune | |
| 6,087,827 A | 7/2000 | Oudet | |
| 6,124,709 A * | 9/2000 | Allwine | 324/207.2 |
| 6,175,233 B1 | 1/2001 | McCurley et al. | |
| 6,219,212 B1 | 4/2001 | Gill et al. | |
| 6,304,078 B1 | 10/2001 | Jarrard et al. | |
| 6,326,781 B1 | 12/2001 | Kunde et al. | |
| 6,384,598 B1 | 5/2002 | Hobein et al. | |
| 6,466,889 B1 | 10/2002 | Schödlbauer | |
| 6,512,366 B2 | 1/2003 | Siess | |
| 6,515,571 B2 | 2/2003 | Takeda | |
| 6,518,749 B1 | 2/2003 | Oudet et al. | |
| 6,545,463 B1 | 4/2003 | Dettmann et al. | |
| 6,552,534 B2 | 4/2003 | Desbiolles et al. | |
| 6,573,709 B1 | 6/2003 | Gandel et al. | |
| 6,576,890 B2 | 6/2003 | Lin et al. | |
| 6,593,734 B1 * | 7/2003 | Gandel et al. | 324/207.25 |
| 6,731,108 B2 | 5/2004 | Zalunardo et al. | |
| 6,848,187 B2 | 2/2005 | Ito et al. | |
| 6,922,052 B2 | 7/2005 | Steinruecken et al. | |
| 6,935,193 B2 | 8/2005 | Heisenberg et al. | |
| 6,941,241 B2 | 9/2005 | Lee et al. | |
| 6,960,974 B2 | 11/2005 | Wan et al. | |
| 6,992,478 B2 | 1/2006 | Etherington et al. | |
| 7,026,809 B2 * | 4/2006 | Dufour | 324/174 |
| 7,028,545 B2 | 4/2006 | Gandel et al. | |
| 7,030,608 B2 | 4/2006 | Kawashima et al. | |
| 7,049,808 B2 | 5/2006 | Martinez et al. | |
| 7,088,096 B2 | 8/2006 | Etherington et al. | |
| 7,116,210 B2 | 10/2006 | Lawrence et al. | |
| 7,215,112 B1 | 5/2007 | Recio et al. | |
| 7,239,131 B2 | 7/2007 | Halder et al. | |
| 7,293,480 B2 | 11/2007 | Matsui et al. | |
| 7,304,450 B2 | 12/2007 | Prudham | |
| 7,363,825 B2 | 4/2008 | Feng et al. | |
| 7,421,923 B2 | 9/2008 | Kim | |
| 7,501,929 B2 | 3/2009 | Lawrence et al. | |
| 7,589,445 B2 | 9/2009 | Gandel et al. | |
| 7,644,635 B2 | 1/2010 | Prudham et al. | |
| 7,671,583 B2 | 3/2010 | Diegel et al. | |
| 7,741,839 B2 | 6/2010 | Jarrard | |
| 7,784,365 B2 | 8/2010 | Masson et al. | |
| 7,898,122 B2 | 3/2011 | Andrieux et al. | |
| 7,906,959 B2 | 3/2011 | Frachon et al. | |
| 7,923,998 B2 | 4/2011 | Hammerschmidt | |
| 8,072,209 B2 | 12/2011 | Jerance et al. | |
| 2003/0137293 A1 * | 7/2003 | Welsch et al. | 324/207.2 |
| 2003/0155909 A1 | 8/2003 | Steinruecken et al. | |
| 2004/0130314 A1 | 7/2004 | Bossoli et al. | |
| 2005/0218727 A1 | 10/2005 | Gandel et al. | |
| 2006/0123903 A1 | 6/2006 | Gandel et al. | |
| 2007/0008063 A1 | 1/2007 | Lawrence et al. | |
| 2007/0024043 A1 | 2/2007 | Abe | |
| 2007/0090827 A1 | 4/2007 | Jarrard | |
| 2008/0100284 A1 * | 5/2008 | Dobler et al. | 324/207.2 |
| 2008/0150519 A1 | 6/2008 | Hoeller et al. | |
| 2008/0250873 A1 | 10/2008 | Prudham et al. | |
| 2008/0284261 A1 | 11/2008 | Andrieux et al. | |
| 2008/0314164 A1 | 12/2008 | Masson et al. | |
| 2009/0062064 A1 | 3/2009 | Kamada et al. | |
| 2010/0045275 A1 | 2/2010 | Frachon | |
| 2010/0097051 A1 * | 4/2010 | Bussan | 324/207.21 |
| 2010/0194385 A1 | 8/2010 | Ronnat et al. | |
| 2010/0231205 A1 | 9/2010 | Jerance et al. | |
| 2010/0253324 A1 | 10/2010 | Jarrard | |
| 2011/0043194 A1 | 2/2011 | Frachon et al. | |
| 2011/0184691 A1 | 7/2011 | Mehnert et al. | |
| 2011/0254543 A1 * | 10/2011 | Frachon et al. | 324/207.25 |
| 2011/0267040 A1 | 11/2011 | Frachon | |

FOREIGN PATENT DOCUMENTS

| | | | |
|---|---|---|---|
| DE | 102006051621 | 5/2008 | |
| EP | 0 273 481 | 7/1988 | |
| EP | 0 665 416 | 8/1995 | |
| EP | 0 800 055 | 10/1997 | |
| EP | 1 014 039 | 6/2000 | |
| EP | 1 074 818 | 2/2001 | |
| EP | 1 219 527 | 7/2002 | |
| EP | 1 353 151 | 10/2003 | |
| EP | 1 477 772 | 11/2004 | |
| EP | 1 532 425 | 5/2005 | |
| FR | 2 670 286 | 6/1992 | |
| FR | 2 724 722 | 3/1996 | |
| FR | 2 764 372 | 12/1998 | |
| FR | 2 790 549 | 9/2000 | |
| FR | 2 809 808 | 12/2001 | |
| FR | 2 845 469 | 4/2004 | |
| FR | 2 893 410 | 5/2007 | |
| FR | WO2007/057563 * | 5/2007 | 324/207.25 |
| FR | 2 898 189 | 9/2007 | |
| FR | WO2008/071875 * | 6/2008 | 324/207.25 |
| FR | 2 919 385 | 1/2009 | |
| FR | 2 923 903 | 5/2009 | |
| JP | 2006-119082 | 5/2006 | |
| KR | 2008-0077369 | 8/2008 | |
| KR | 2008-0104048 | 11/2008 | |
| WO | WO 97/16736 | 5/1997 | |
| WO | WO 99/11999 | 3/1999 | |
| WO | WO 2004/015375 | 2/2004 | |
| WO | WO 2005/076860 | 8/2005 | |
| WO | WO 2007/014599 | 2/2007 | |
| WO | WO 2007/057563 | 5/2007 | |
| WO | WO 2007/099238 | 9/2007 | |
| WO | WO 2008/101702 | 8/2008 | |
| WO | WO 2008/138662 | 11/2008 | |
| WO | WO 2009/047401 | 4/2009 | |
| WO | WO 2009/101270 | 8/2009 | |

* cited by examiner

BIDIRECTIONAL MAGNETIC POSITION SENSOR HAVING FIELD ROTATION

CROSS-REFERENCE TO RELATED APPLICATIONS

This application is a National Phase Entry of International Application No. PCT/FR2010/052320, filed on Oct. 28, 2010, which claims priority to French patent application Ser. No. 09/05356, filed on Nov. 6, 2009, both of which are incorporated by reference herein.

TECHNICAL FIELD

The present invention concerns the field of contactless magnetic position sensors the purpose of which is to supply simultaneously two independent output signals representing a position in two directions (translation and translation, translation and rotation, rotation and rotation. Sensors that detect the position from a magnetic field have many advantages:
- no mechanical contact with the moving part, and therefore no wear,
- insensitivity to dirt,
- reduced production costs,
- long service life.

The majority of contactless magnetic position sensors are in only one direction (a rotation OR a translation) but more and more applications are being seen to appear where a sensor in two directions (bidirectional sensor) is necessary, such as for example for detecting the position of transmission members or generally a rotation and a translation are combined. In such applications it is particularly important to have position information in a direction that is not dependent on the position in the other direction (independent output signals).

BACKGROUND

The majority of bidirectional sensors already existing use permanent magnets associated with a more or less complex magnetic circuit, made from ferromagnetic material used to guide and/or concentrate the magnetic flux generated by the permanent magnet or magnets, but to the detriment of the cost and performance of the sensor. Thus, in the prior art, the patent FR 2786266 of the applicant is known, relating to a position sensor in two directions but in which the space requirement and the surface area of the magnet used limit the practical use of this sensor for long travels. This sensor also has high hysteresis due to the ferromagnetic stators and the measurement depends on the variation in the remenant induction, which must therefore be compensated for.

Moreover, European patent EP 800055 describes a linear angular position sensor. This sensor delivers analogue signals that are difficult to use since they are non-linear and of a low level. Such sensors require several separate measuring points for measuring the relative position in two directions. In addition, they require stator parts that contribute hysteresis and the sensitive elements measure the amplitude of the field and are therefore sensitive to geometric tolerances and temperature. The U.S. Pat. No. 4,639,667 or WO 9716736 describe sensors functioning according to principles that do not make it possible to deliver linear and independent signals representing the position in two dimensions.

There also exist bidirectional sensors that are merely the putting end to end of two independent unidirectional sensors, such as for example the patent WO 2008138662 and the U.S. Pat. No. 6,175,233 describing two linear sensors that each measure one direction. For each sensor there is a magnet and an element for detecting the magnetic field, the consequence of which is to lead to a high space requirement and high production cost. In addition, these sensors measure the amplitude of the field and are therefore also sensitive to geometric tolerances and temperature.

There are also known, in the prior art, the U.S. Pat. No. 7,421,923 and U.S. Pat. No. 7,293,480, which are sensors for detecting gears engaged by a gear lever. Such patents present a solution for detecting positions in two directions but use a magnet and at least as many Hall sensors positioned in space as there are gears to detect. It is therefore necessary to use an array of sensors for discriminating single positions and to obtain a digital detection of the gears. The multiple number of sensors means that this solution is expensive to implement and does not offer means for knowing the intermediate positions.

To remedy the problems relating to the position detection by measuring amplitude described above, there exist position sensors that measure the rotation of the magnetic field, in other words the direction thereof, rather than the amplitude thereof. However, this applies mainly to unidirectional rather than bidirectional sensors.

There are known for example in the prior art sensors as described in the patents FR 2898189 and FR 2909170 of the applicant, which use the direction of the field rather than the amplitude for detecting a relative position between a magnet and a magnetosensitive probe. This measurement of direction makes it possible to be insensitive to temperature and to mechanical clearances and does not use any ferromagnetic part and therefore does not have magnetic hysteresis. However, such sensors measure only one magnetic field direction via the calculation of a single amplitude ratio from two components of the magnetic field, and can therefore know the relative position of a movable magnet with respect to a magnetosensitive probe only in one direction rather than two. Likewise, the patents and patent applications U.S. Pat. Nos. 6,731,108, 6,960,974 and WO 2004015375 afford only measurement of the linear movement of a magnet with respect to one or more magnetosensitive elements using the field direction. However, for practical implementation of travels greater than 20-25 mm, these sensors require several probes placed on the various parts of the travel, which increases the cost of the sensor and requires precise positioning of the probes.

Solutions are however known in the prior art for measuring bidirectional position and using the measurement of the rotation rather than of the amplitude of the magnetic field but, in the case of very specific applications to control levers (joysticks). Thus the patent applications US 2007024043 or US 20090062064 describe sensors for joysticks that comprise a simple magnet magnetised unidirectionally, along its thickness, and a probe that measures only two components of the field and therefore a single field direction (the angle formed by the two components). This principle does not make it possible to deliver independent linear signals in two directions. Systems of the joystick type are in addition limited only to rotations and cannot measure translations. Moreover, the angle that can be detected by such a joystick system is limited to around 30 degrees. Beyond this, the magnet is situated very far away from the probe, which no longer sees enough magnetic field to deduce a position therefrom. In fact, for a practical implementation for travels greater than 40 degrees, these sensors require several probes based on the different parts of the travel, which increases the cost of the sensor.

There is also found in the prior art a Melexis application note for a measurement of two rotation angles (http://www.melexis.com/Sensor ICs Hall effect/Triaxis Hall ICs/MLX90333 648.aspx) where two joystick configurations are presented. The first is a solution where the centre of rotation of the bipolar magnet is merged with the measuring point, which requires a complex and bulky mechanical system that cannot easily be integrated in an application. The second configuration presents a solution where the centre of rotation of the magnet is situated behind the magnet (the magnet is between its centre of rotation and the sensitive elements). In this case, the three components of the magnetic field are used to determine two rotation angles. The magnet used is a cylinder with a very small diameter with a magnetisation that is constant in amplitude and direction along its thickness. That is to say the magnetisation of the magnet at any point on this magnet has the same modulus and is perpendicular to the top and bottom faces of the magnet. This very specific configuration is intended only for measuring two angles and for very short travel (around 30 degrees). This is because, in order to be able to detect the rotation of the magnet with the algorithm used, it is necessary for the diameter of the magnet to be small (theoretically a punctiform magnet with radial magnetisation), which means that, as soon as we have a small rotation of the magnet, the magnet moves away from the magnetosensitive elements and the magnetic induction becomes too small at the magnetosensitive elements of the probe to have precise detection of the rotation of the magnet. This is why this type of system requires a magnet with very high remanence (typically Br>1.2 T) and very thick (thickness >10 mm), which is therefore expensive and difficult to magnetise, with what is in addition a large axial thickness (typically >10 mm), which causes a problem of space requirement. In addition, with these solutions, the mechanical air gap between the surface of the flat magnet and the measuring point varies according to the rotations of the magnet, which involves deterioration in linearity and a larger air gap than necessary to avoid collision of the edges of the magnet with the probe support. The ideal thing for preventing this is a magnet with a very small diameter but which poses the problems already mentioned above.

SUMMARY

The invention presented here therefore proposes in particular to remedy, in a simple and efficient manner, the problems of bidirectional sensors disclosed above (limited travel, measurement only of rotations, magnets of high remanence and thick, high space requirement and cost, etc). In particular, we propose an absolute position sensor in any two directions (translation-translation, translation-rotation or rotation-rotation) measuring the relative movement between a magnetised element and a magnetosensitive probe measuring at least two components of the magnetic field substantially at the same point, without any high or low travel limitation and preferentially using the measurement of the direction of the magnetic field rather than the amplitude thereof.

More precisely, we propose a magnetic position sensor in at least two directions comprising at least one magnetised element (1) and a probe (6) comprising at least two magnetosensitive elements (2) and (3) located substantially at the same point and each measuring one of the components of the magnetic field generated by the said magnetised element (1), the magnetised element (1) being able to move relative to the said mangetosensitive elements (2) and (3), and at least one processing circuit (5) able to make calculations of angles and moduli from algebraic combinations of the components of the magnetic field and supplying at least two independent signals representing the position of the movable element in respectively each of the two directions, characterised in that the magnetisation vector of the magnetised element (1) is variable with respect to the vector normal to the surface of the magnetised element disposed opposite the probe (6) on at least one of the dimensions of the said magnetised element so as to define a unique position of the said probe (6) vis-à-vis the said magnetised element (1).

This variation in the magnetisation vector can be obtained by varying the direction thereof along at least one of the dimensions thereof. In this case, the direction of the magnetisation vector may have several periods over the travel measured. This variation in the magnetisation vector can also be obtained by varying one of the dimensions of the magnetised element along at least one of the two directions causing a variation in the direction of the vector normal to the surface. In this case, the dimension may vary according to a discontinuous function or according to a continuous function of the sinusoidal type. This variation in the magnetisation vector may also be obtained by varying the amplitude thereof along at least one of the two directions.

In all these cases, the magnetisation vector has at least one alternation in direction in at least one of the two directions. In all these cases, the signal processing circuit can make at least two arctangent calculations or at least one arctangent calculation and one modulus calculation. In all these cases, the signal processing circuit can also carry out an arctangent calculation of the ratio of two components of the magnetic field after having applied a correction coefficient between these two components.

In a variant of the invention, the processing circuit is integrated with the magnetosensitive elements in a single component. In a variant of the invention, the magnetised element consists of a permanent magnet and at least one ferromagnetic part. Finally, preferentially, the components of the measured magnetic field vary in a substantially sinusoidal fashion in each of the at least two directions.

In general terms, this sensor has a single magnetised element, preferentially a permanent magnet of the rare earth type (SmCo, NdFeB) or ferrite type, thin and with a length and width substantially equivalent to the required travel, without any limitation in travel other than the size of the magnet. The fact that this sensor uses only a single magnetosensitive probe measuring the three components of the magnetic field at a single point thus leads to a minimum space requirement and limited cost. This sensor uses the ratios of amplitudes between the components of the magnetic field in order to be free of the variations in the magnetic properties of the magnet according to temperature and time and also so as not to be sensitive to geometric tolerances and variations in air gap, which makes it possible to propose an extremely robust solution. This sensor does not have any ferromagnetic parts that are fixed with respect to the magnetosensitive elements and therefore no magnetic hysteresis, while guaranteeing simplicity of the structure. Finally, the sensor provides independent position information for each of the two directions, with very great precision.

The functioning of the sensor is defined more precisely as follows:

Let M be the point where the magnetosensitive elements are grouped together and measure the three components of the magnetic field and O' the midpoint of the external surface of the magnetised element (1) that is opposite the probe (6) where the magnetosensitive elements are integrated. A point O will be used in the case where at least one of the two directions is a rotation with, in this case, O the centre of rotation. We can thus write the following vector equation:

$$\vec{OM} = \vec{OO'} + \vec{O'A} + \vec{AM}$$

The vector $\overrightarrow{OO'}$ is constant, and depends only on the geometry of the magnet, the norm of this vector corresponds to the external radius of the magnet in the case of a tile or spherical magnet and is zero in the case of a parallelepipedal magnet. The vector $\overrightarrow{AM}$ is constant and is oriented along the thickness of the magnet, that is to say $\overrightarrow{AM}=Z_O\vec{n}$, $Z_O$, $z_0$ is commonly referred to as the air gap between the magnetised element and the point M that groups together the magnetosensitive elements. Thus $\overrightarrow{OA}=\vec{x^i}+\vec{y^j}$ is defined as being the vector that represents the position of the magnetised element with respect to the magnetosensitive elements in the two directions of the movable element that are oriented along $\vec{i}$ and $\vec{j}$. For reasons of simplicity, the directions will be denoted X and Y hereinafter and correspond to the relative movements along $\vec{i}$ and $\vec{j}$.

The two directions X and Y can thus be two translations where X and Y correspond to a length, or may be a translation and a rotation where x then corresponds to the length and y to an angle and finally the two directions may be two rotations where x and y both correspond to angles. In order to determine the position of the magnetised element with respect to the magnetosensitive elements in the two directions X and Y of the movable element, it is therefore necessary to determine the coordinates x and y.

In general terms, whether it be for a rectilinear, cylindrical or spherical magnet, hereinafter the thickness corresponds to the dimension of the magnet oriented along the unit vector $\vec{n}$ normal to the top surface of the magnet, the length corresponds to the dimension of the magnet oriented by the vector $\vec{i}$ tangent to the top surface of the magnet and the depth corresponds to the dimension of the magnet oriented by the vector $\vec{j}$ also tangent to the top surface of the magnet and perpendicular to the vector $\vec{i}$. In the case of a rectilinear, cylindrical or spherical magnet, the reference frame ($\vec{i}$ $\vec{j}$ $\vec{n}$) used is respectively a Cartesian, polar or spherical reference frame.

According to a first embodiment, the sensor consists of a magnetised element (preferentially a permanent magnet) generating a magnetic field the normal component (along $\vec{n}$) on the one hand and the tangential (along $\vec{i}$) and transverse (along $\vec{j}$) components on the other hand, measured on its surface, vary periodically (according to reference mechanical periods called λx and λy), the effective variation along the surface being able to correspond to one or more whole periods or fractions of periods. According to a preferred configuration, the magnetised element will have a length and depth substantially similar to the travels used as well as a magnetisation the direction of which varies substantially linearly in the two directions X and Y thereof and with respect to its thickness, its length AND its depth.

This means that, at any point A on the external surface of the magnetised element, the angle between the magnetisation vector $\vec{M}$ and the normal vector $\vec{n}$, that is to say $\vec{M}$, $\vec{n}$, and the angle between the magnetisation vector $\vec{M}$ and the vector $\vec{i}$, that is to say $\vec{M}$, $\vec{i}$, vary linearly in the direction X AND the angle between the magnetisation vector $\vec{M}$ and the normal vector $\vec{n}$ $\vec{M}$, $\vec{n}$ and the angle between the magnetisation vector $\vec{M}$ and the vector $\vec{j}$ vary linearly in the direction Y. In the vicinity of this magnetised element, this magnetisation generates a magnetic field $\vec{B}$ ($\vec{B}=Bx\vec{i}+By\vec{j}+Bz\vec{n}$) the tangential (Bx), normal (Bn) and transverse (By) components of which are substantially sinusoidal, over a major part of the travel in the directions X and Y.

We will therefore consider a magnet of length Lx, width Ly and thickness Lz, and $M(x,y,z_0)$ a point of measurement of the components Bx, By, Bz of the magnetic field generated by the magnetised element. $+/-y_{max}$ is the maximum travel that we wish to measure in the direction Y, $y_{max}$ being less than, equal to or greater than the width of the magnetised element. $+/-x_{max}$ is the maximum travel that we wish to measure in the direction X, $x_{max}$ being less than, equal to or greater than the length of the magnetised element.

We wish to know the position along X and Y, that is to say x and y. $z_0$ corresponds to the measurement air gap between the movable element and the fixed element. The components By and Bz of the magnetic field have the same phase along X, whereas the component Bx is out of phase by a quarter of a period. In this first embodiment, the magnetisation generates a magnetic field such that we can write as follows the components of the magnetic field at $M(x,y,z_0)$:

$$Bx(x, y, z_o) = Bx\text{MAX} * \cos\left(\frac{2\pi}{\lambda_x} * x + \phi\right) * \cos\left(\frac{2\pi}{\lambda_x} * \right) * \frac{A}{z_o}$$

$$By(x, y, z_o) = By\text{MAX} * \sin\left(\frac{2\pi}{\lambda_x} * x + \phi\right) * \sin\left(\frac{2\pi}{\lambda_x} * \right) * \frac{A}{z_o}$$

$$Bz(x, y, z_0) = Bz\text{MAX} * \sin\left(\frac{2\pi}{\lambda_x} * x + \phi\right) * \cos\left(\frac{2\pi}{\lambda_x} * \right) * \frac{A}{z_o}$$

where λx and λy are respectively the wavelengths for which the magnetic field turns through 360 degrees along respectively X and Y and A a non-zero constant particular to each sensor that depends on the air gap between the surface of the magnetised element and the magnetosensitive elements as well as the geometry of the magnetised element.

For this first preferred embodiment, the magnetisation is normal to the centre of the magnet at O', and therefore we have $$\Phi = \frac{\pi}{2}.$$

The magnetisation may, for example, turn through 360 degrees along X and Y. This means that the magnetisation turns through 360 degrees over the length of the magnetised elements and 360 degrees over the width of the magnetised element, which in this case gives us λx=Lx and λy=Ly. We then have at any point $M(x,y,z_o)$ above the magnetised element:

$$Bx(x, y, z_o) = Bx\text{MAX} * \cos\left(\frac{2\pi}{L_x} * x + \frac{\pi}{2}\right) * \cos\left(\frac{2\pi}{L_y} * y\right) * \frac{A}{z_o}$$

$$By(x, y, z_o) = By\text{MAX} * \sin\left(\frac{2\pi}{L_x} * x + \frac{\pi}{2}\right) * \sin\left(\frac{2\pi}{L_y} * y\right) * \frac{A}{z_o}$$

$$Bz(x, y, z_o) = Bz\text{MAX} * \sin\left(\frac{2\pi}{L_x} * x + \frac{\pi}{2}\right) * \cos\left(\frac{2\pi}{L_y} * y\right) * \frac{A}{z_o}$$

Naturally, according to the magnetic field generated by the magnetised element, the wavelength λy can be much greater than the width of the magnetised element Ly as for FIGS. 4, 5 and 6, where λy is larger than the width Ly, which means that the magnetised field turns through less than 360 degrees over the width of the magnetised element.

If the components Bx, By and Bz of the magnetic field are measured at any point M in the space that surrounds the magnetised element, it is possible to know the position in the directions X and Y by applying the following formulae in order to deduce x and y therefrom. This measurement of the three magnetic components can be carried out for example by three magnetosensitive elements located at the same point and integrated in the same package called a probe (6) using components of the MLX90333 or HAL3625 etc type. From these three components we can make the following calculation (FIG. 9):

a tan(kxBz/Bx)

a tan t(kyBz/By)

with: Bx, By, Bz components of the magnetic field measured at point M of coordinates x,y,z0 and kx, ky correcting gain coefficients allocated to the measurement of the field components to standardise the components. This calculation can be made inside a single component that comprises the magnetosensitive element or then can be carried out by an element external to the probe (microcontroller, microprocessor, ECU, etc).

By applying these formulae there are obtained:

$$\text{Atan}\left(kx\frac{Bz}{Bx}\right) = \text{atan}\left(\left(kx*Bz\text{MAX}*\sin\left(\frac{2\pi}{L_x}*x+\frac{\pi}{2}\right)*\cos\left(\frac{2\pi}{L_y}*y\right)*\frac{A}{z_o}\right)/\right.$$

$$\left(Bx\text{MAX}*\cos\left(\frac{2\pi}{L_x}*x+\frac{\pi}{2}\right)*\cos\left(\frac{2\pi}{L_y}*y\right)*\frac{A}{z_o}\right)\right) = \text{atan}$$

$$\left(\left(kx*Bz\text{MAX}*\sin\left(\frac{2\pi}{L_x}*x+\frac{\pi}{2}\right)\right)/\left(\left(Bx\text{MAX}*\cos\left(\frac{2\pi}{L_x}*x+\frac{\pi}{2}\right)\right)\right) =$$

$$\text{atan}\left(kx*\frac{Bz_{max}}{Bx_{max}}*\tan\left(\frac{2\pi}{L_x}*x+\frac{\pi}{2}\right)\right) = \frac{2\pi}{L_x}*x+\frac{\pi}{2} \text{ aveckx} = \frac{Bx_{max}}{Bz_{max}}$$

with

A tan(kx Bz/Bx) is therefore the linear function of variable x and the evaluation thereof by calculation enables us to determine the value x and therefore the position in the direction X of the point M with respect to the centre of the magnetised element O'. M being the point where the magnetosensitive elements are placed, we thus know the relative position of the magnetised element with respect to the magnetosensitive elements. The relative position along X is therefore independent of the temperature and air gap and can be determined with high precision (typically less than 1% of the full travel). So that this output is equal to zero when x=0, this can be done via programming of the probe (6) since the slope and the ordinate at the origin depend on the magnet and its magnetisation only and are therefore programmable.

We can likewise calculate arctan(ky Bz/By)

$$\text{Atan}\left(ky\frac{Bz}{By}\right) = \frac{2\pi}{L_y}*y+\frac{\pi}{2} \text{ avec } ky = \frac{By_{max}}{Bz_{max}}$$

This leads to the relative position in the direction Y of the magnetised element with respect to the magnetosensitive elements, as explained previously for the position along X. Consequently such a magnetisation and such a processing of the signals as described in this first embodiment enable us to determine the relative position in two directions X and Y of the magnetised element with respect to the magnetosensitive elements from the three components of the magnetic field measured at the same point M. We can also, with the same magnetisation, use the following postprocessing:

$$\text{Atan}\left[\frac{\sqrt{(Kz*Bz^2+Ky*By^2)}}{Bx}\right] \text{ and } \text{Atan}\left[\frac{\sqrt{(Kz*Bz^2+Kx*Bx^2)}}{Bx}\right]$$

According to a second embodiment, the present invention consists of a magnetised element (preferentially a permanent magnet) generating a magnetic field, the normal component (along $\vec{n}$) on the one hand and the tangential (along $\vec{i}$) and transverse (along $\vec{j}$) components on the other hand, measured at the surface thereof, varies periodically (according to reference mechanical periods called λx and λy, the effective variation along the surface being able to correspond to one or more whole periods or factions of periods. According to this second embodiment, the magnetised element will have a magnetisation where the direction varies substantially linearly along only one of its two directions and with respect to its thickness AND its length. This means that, at any point A on the magnetised element the angle between the magnetisation vector $\vec{M}$ and the normal vector $\vec{n}$, that is to say ($\vec{M}, \vec{n}$) and the angle between the magnetisation vector $\vec{M}$ and the vector $\vec{i}$, that is say ($\vec{M}, \vec{i}$) vary linearly in the direction X, but that the angle between the magnetisation vector $\vec{M}$ and the vector J is constant in the direction Y.

This second embodiment requires a narrow magnetised element (<30 mm or equivalent in terms of angle) so that, in the vicinity of this magnetised element, this magnetisation generates a magnetic field the tangential (Bx), normal (Bn) and transverse (By) components of which with respect to the magnet are substantially sinusoidal over a major part of the travel and are of the same form as the components of the first embodiment. A narrow magnet enables us, by virtue of the edge effects, to obtain a magnetic field at M that varies in the direction Y without for all that the magnetised element having a variable magnetisation in this direction. For this second preferred embodiment, the magnetisation may be normal, tangential or other at the centre of the magnet at O', and therefore in this case we have φ=[0;2π], the magnetisation may turn through 360 degrees in the direction X but will turn by less than 180 degrees in the direction Y, which gives us for example λx=Lx and λy=2Ly.

We then have, at any point M(x,y,$z_o$) above the magnetised element:

$$Bx(x,y,z_o) = Bx\text{MAX}*\cos\left(\frac{2\pi}{L_x}x+\phi\right)*\cos\left(\frac{\pi}{L_y}*y\right)*\frac{A}{z_o}$$

$$By(x,y,z_o) = By\text{MAX}*\sin\left(\frac{2\pi}{L_x}x+\phi\right)*\sin\left(\frac{\pi}{L_y}*y\right)*\frac{A}{z_o}$$

$$Bz(x,y,z_o) = Bz\text{MAX}*\sin\left(\frac{2\pi}{L_x}x+\phi\right)*\cos\left(\frac{\pi}{L_y}*y\right)*\frac{A}{z_o}$$

In the same way as for the first preferred embodiment, we can calculate a tan(kx Bz/Bx) and Bz/By) and thus obtain:

$$\text{Atan} = \frac{2\pi}{L_x} * x + \phi,$$

the output of this function will vary from $2\pi$ over the travel of length Lx $$\text{Atan} = \frac{\pi}{L_y} * y + \phi,$$

the output of this function will vary solely by $\pi$ over the travel of length Ly.

We can also, in this embodiment, calculate the arctangent in order to determine the position along X and, knowing this position, we can use only the value of the component By in order to derive therefrom the position along Y. This postprocessing does however have the disadvantage of using directly a component, which means that this solution will be sensitive to the variation in air gap $z_0$ and to the temperature but is very suitable when there are only a few discrete positions to be determined, such as for a gearbox application where only the knowledge of the 6 or 7 gears over a given range is necessary and where the intermediate positions do not need to be known.

According to a third preferred embodiment, the magnet will have a magnetisation the direction of which is constant and for which the magnetisation vector $\vec{M}$ any point on the magnetised element is colinear with $\vec{n}$ or $\vec{i}$ or $\vec{j}$, in other words the magnetisation is along the thickness, the length or the width of the magnetised element. On the other hand, the magnetised element will have a thickness that varies almost sinusoidally along its two directions X and Y. This almost sinusoidal variation in thickness over a half period combined with a uniform magnetisation generates a magnetic field above the magnet the components of which are substantially sinusoidal and are expressed in a similar fashion to the case of the first embodiment described above. According to this third preferred embodiment, the magnetic field generated by this magnetised element will turn only by approximately 180 degrees in the directions X and Y, which give us for example $\lambda x=2Lx$ and $\lambda y=2Ly$. The processing of the two components will be identical to the first embodiment in order to determine x and y.

According to a fourth embodiment, the magnetised element will have a magnetisation the direction of magnetisation of which is constant and for which the magnetisation vector $\vec{M}$ at any point on the magnet is colinear with $\vec{n}$ or $\vec{i}$ or $\vec{j}$, in other words the magnetisation is along the thickness, the length or the width of the magnetised element. On the other hand, the magnetised element will have a thickness that varies almost sinusoidally along only one of its two directions X or Y. This fourth embodiment requires a thin magnet (<30 mm or equivalent in terms of angle) so that, in the vicinity of this magnetised element, this magnetisation generates a magnetic field the tangential (Bx), normal (Bn) and transverse (By) components with respect to the magnet are substantially sinusoidal, over a major part of the travel, and are of the same form as the components of the first embodiment. A narrow magnetised element enables us, by virtue of the edge effects, to obtain a magnetic field at M that varies in the direction Y without for all that the magnetised element needing its thickness to vary in the direction Y.

In the same way as for the third preferred embodiment, the magnetic field generated by this magnetised element turns only by approximately 180 degrees in the directions X and Y, which gives us for example $\lambda x=2Lx$ and $\lambda y=2Ly$. The processing of the components is identical to the first embodiment for determining the positions x and y.

According to a fifth embodiment, the magnetised element will have a magnetisation the direction of which varies substantially linearly in only one of its two directions and with respect to its thickness AND its length. This means that, at any point A on the magnetised element, the angle between the magnetisation vector $\vec{M}$ or $\vec{n}$ or and the normal vector ($\vec{M}$, $\vec{n}$), that is to say $\vec{M}$, and the angle between the magnetisation vector $\vec{i}$ and the vector that is to say ($\vec{M}$, $\vec{i}$) varies linearly in the direction X but that the angle between the magnetisation vector $\vec{M}$ and the vector $\vec{j}$ is constant in the direction Y. In addition, unlike the second embodiment, the magnetised element has a variation in its thickness along only one of its two directions (Y) and varies according to a discontinuous function in the form of a staircase.

In this case we can use only the components Bx and Bz of the magnetic field and carry out the following postprocessing:

$$A\tan(kyBz/By) \text{ and } \|Bx\vec{i}+Bz\vec{j}\|=\sqrt{Bx^2+Bz^2}$$

Calculation of the angle gives us very precise information on the linear position along X and the modulus gives us rough position information in the direction Y, given that we have a magnet in the form of a staircase. This solution may however be very useful when we have a probe with only two measurable components such as MLX90316 or the like and makes it possible to discretise positions along Y. The number of stairs that the magnet has along Y corresponds typically to the number of positions that we can discretise. This embodiment can be used for discriminating gears in a gearbox application for example.

According to a sixth embodiment, the magnetised element has a magnetisation the direction of which is constant preferentially along its thickness, without this being exclusive. This means that the magnetisation vector M at any point on the magnet is colinear with $\vec{n}$. On the other hand, the amplitude of the magnetisation vector varies linearly along one or two of its two directions. This means that, at any point A on the magnetised element, the magnetisation vector $\vec{M}$ is oriented along the thickness of the magnet but the amplitude of this vector varies sinusoidally along one or two of its directions X and Y. We will therefore have:

$$\vec{M}=A(x,y)\vec{n} \text{ with } A(x,y)=A_1\sin(x)+A_2\sin(y)+\text{constante},$$

A1 and A1 being constants that depend on the magnetised element.

According to a seventh embodiment, which applies to the cases where at least one direction is a rotation (it would be denoted Y), the present invention consists of a magnetised element in the form of a tile. According to this embodiment, the magnetised element will have diametral magnetisation where the magnetisation direction varies substantially linearly along its rotation direction Y and with respect only to its thickness. This means that, at any point A on the magnetised element, the angle between the magnetisation vector $\vec{M}$, and the normal vector $\vec{n}$, that is to say ($\vec{M}$, $\vec{n}$) varies linearly in the direction of rotation Y and that the angle between the magnetisation vector $\vec{M}$ and the vector $\vec{i}$, that is to say ($\vec{M}$, $\vec{i}$), is constant in the direction X, X being a translation direction. In addition, a diametral magnetisation means that the magnetisation vectors $\vec{M}$ at each point A on the magnetised element $\vec{M}$ are colinear, as shown by FIG. 19.

This embodiment requires a short magnetised element (<30 mm or equivalent in terms of angle) so that, in the vicinity of this magnetised element, this magnetisation generates a magnetic field the tangential (Bx), normal (Bn) and transverse (By) components of which with respect to the magnet are substantially sinusoidal over a major part of the travel and are of the same form as the components of the first embodiment. A short magnetised element enables us, by virtue of the edge effects, to obtain a magnetic field at M that varies in the direction X without for all that the magnetised element having a magnetisation that is variable in this direction. According to this preferred embodiment, the magnetisation may be normal, tangential or other at the centre of the magnet at O', and therefore in this case we have $\phi=[0;2\pi]$, the magnetisation turning approximately as much as the angle of the magnet tile. That is to say, if we have a tile of 90 degrees, the components of the magnetic field generated by this tile turn by approximately 90 degrees.

According to an eighth embodiment, the magnetised element has a length and depth substantially adjacent to the useful travels as well as a magnetisation the direction of which varies discontinuously in the two directions. At any point A on the magnetised element, the angle between the magnetisation vector $\vec{M}$ and the normal vector $\vec{n}$, that is to say $(\vec{M}, \vec{n})$, alternates between 0 degrees and 180 degrees in the direction X or in the two directions X and Y as in FIG. 20. In the vicinity of this magnetised element, this magnetisation generates a magnetic field $\vec{B}(\vec{B}=Bx\vec{i}+By\vec{j}+Bz\vec{n})$ the tangential (Bx), normal (Bn) and transverse (By) components of which with respect to the magnet are substantially sinusoidal over a major part of the travel in the directions X and Y, and, by applying the same postprocessing of the components as in the first embodiment, we can derive therefrom the position of the magnetised element with respect to the magnetosensitive elements in the two directions X and Y. Naturally these embodiments are non-exhaustive and other magnetisation or magnet geometry configurations are possible.

BRIEF DESCRIPTION OF THE FIGURES

The invention will be understood better from a reading of the following description with reference to the following figures.

DETAILED DESCRIPTION

Figure 1:
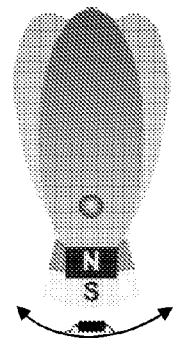
FIG. 1 shows a solution of the prior art.

FIG. 1 shows a solution of the prior art that makes it possible to measure two rotation angles. In this case, the three components of the magnetic field are used to determine the two rotation angles. The magnet used is a cylinder of constant thickness and magnetised only through its thickness. This very specific configuration is only intended for measuring two angles and for very small travels since this constant magnetisation through the thickness is not appropriate for measuring an angle greater than around 30 degrees.

Figure 2A:
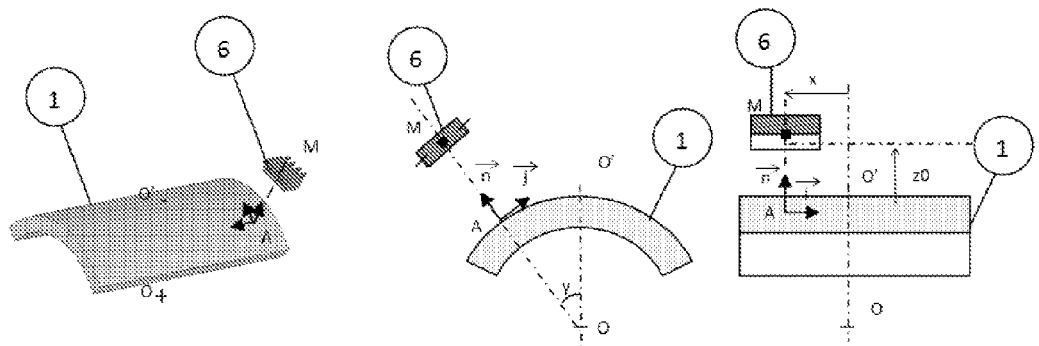
FIGS. 2*a*, 2*b* and 2*c* show the various geometric forms of the magnetised element and the associate reference frames.
Figure 2B:
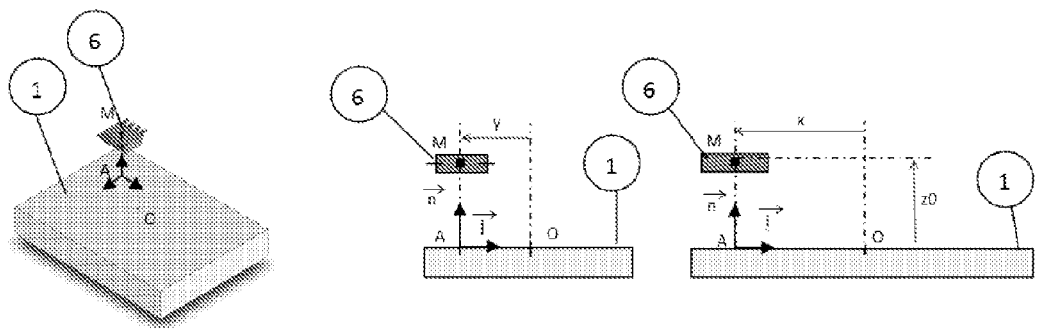
Figure 2C:
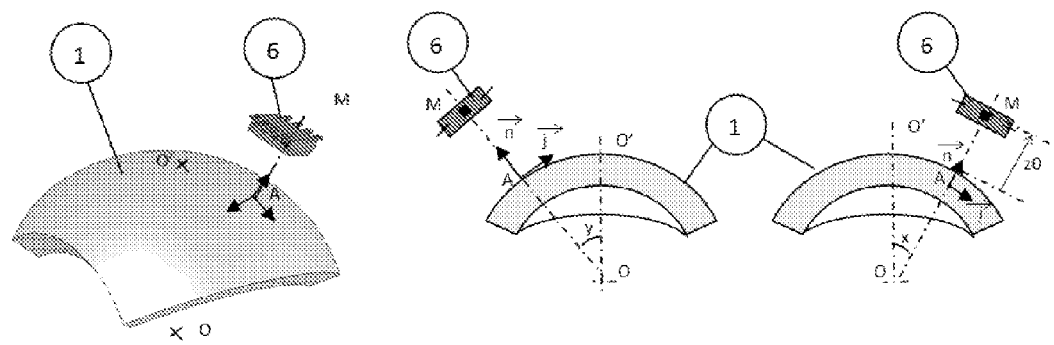

FIGS. 2*a*, 2*b*, 2*c* are perspective, front and side views of magnetised elements (1) and probes (6) used in our embodiments for determining the position (x,y) of the magnetised element (1) with respect to the probe (6) respectively in a rotation and a translation (FIG. 2*a*), two translations (FIG. 2*b*) and two rotations (FIG. 2*c*).

Figure 11:
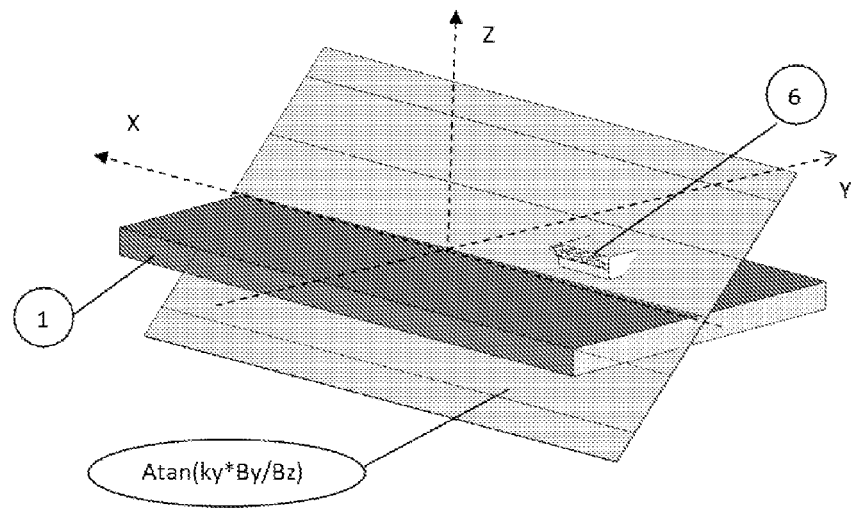
FIG. 11 shows an output signal according to one embodiment of the present invention that makes it possible to determine the position along the direction Y independently of the position along X.
Figure 12:
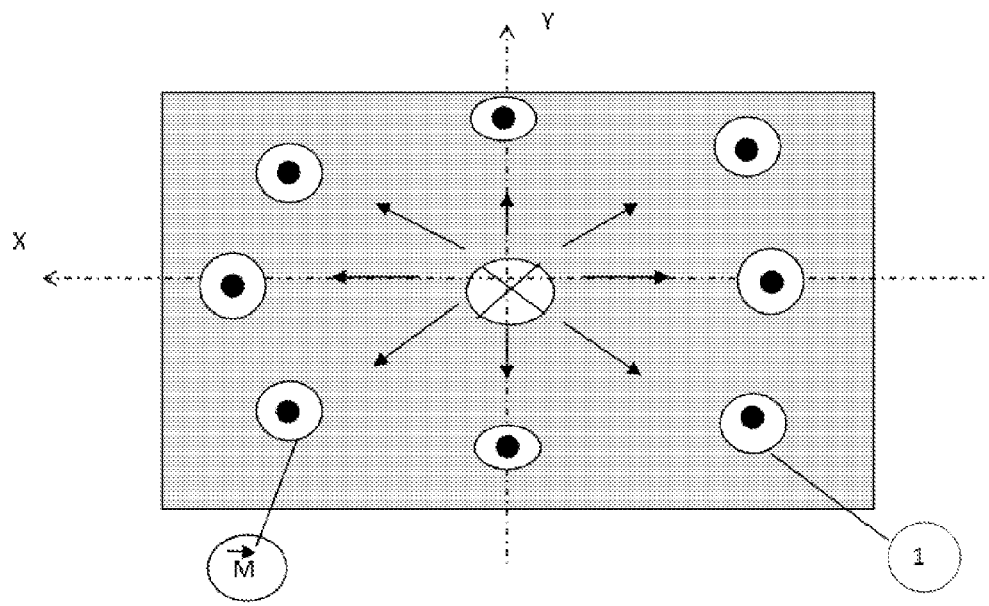
FIG. 12 is a plan view of a rectilinear magnetised element of constant thickness that has a sinusoidal magnetisation in several directions according to one embodiment of the present invention.
Figure 13:
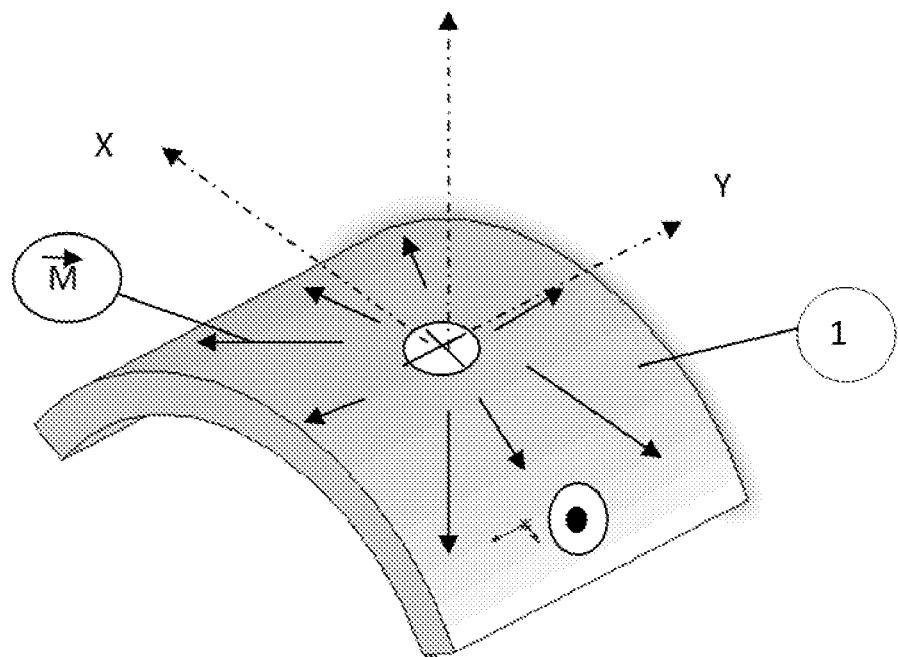
FIG. 13 is a perspective view of a magnetised tile element of constant thickness that has sinusoidal magnetisation in several directions where X is a rotation and Y a translation.
Figure 17:
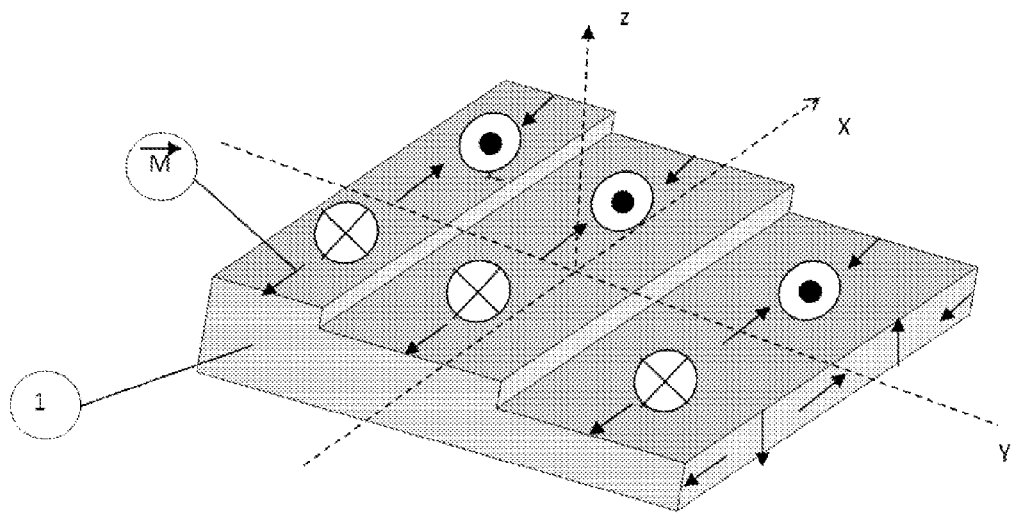
FIG. 17 shows a magnet the thickness of which varies discontinuously in the direction Y and has sinusoidal magnetisation in the direction X.
Figure 18:
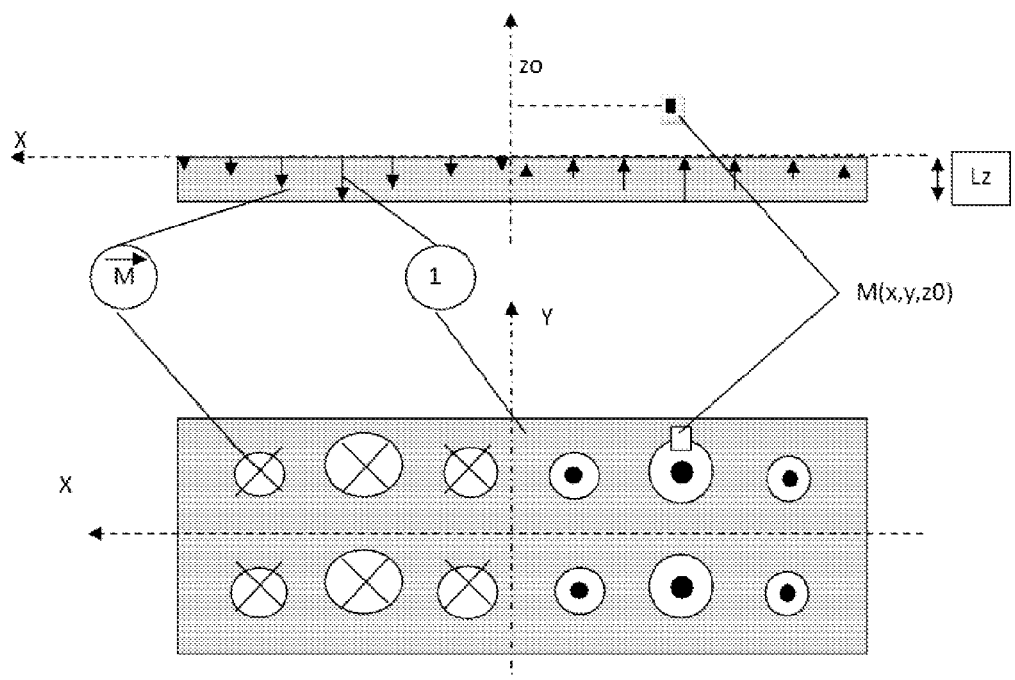
FIG. 18 is a side and plan view of a magnetised element the thickness of which is constant and which has magnetisation through its thickness but the amplitude of which is sinusoidal in the direction X.
Figure 19:
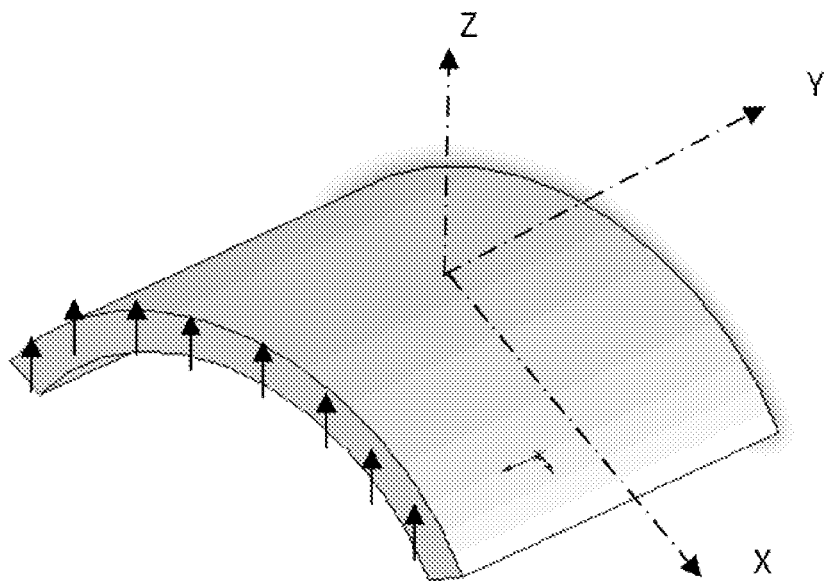
FIG. 19 is a perspective view of a tile magnetised element of constant thickness and diametral magnetisation, where the direction X is a rotation and the direction Y is a translation.

Consequently the movement surface of the probe 6 consists of a portion of a cylinder coaxial with the cylindrical top surface of the magnetised element 1 in the embodiments in FIGS. 2*a*, 13 and 19, by a flat portion parallel to the flat top surface of the magnetised element 1 in the embodiments in FIGS. 2b, 3 to 6, 10 to 12, 14, 18 and 20 to 21, and by a portion of a sphere concentric with the spherical top surface of the magnetised element 1 in the embodiment in FIG. 2c. On the other hand, in the embodiments in FIGS. 15 and 16, in which the probe 6 moves in a movement surface consisting of a plane parallel to a midplane of the magnetised element 1, the distance between the probe 6 and the non-flat top surface of the magnetised element 1 changes, to within a positive constant, as a sinusoidal function of the relative positions of the probe 6 and magnetised element 1 in each of the directions X and Y for the embodiment in FIG. 15, and in the direction X with the embodiment in FIG. 16. Likewise, in the embodiment in FIG. 17, in which the probe moves in a movement surface consisting of a plane parallel to a fixed plane of the magnetised element 1, the distance between the probe 6 and the non-flat top surface of the magnetised element 1 changes, to within a positive constant, as a pseudo-sinusoidal function of the relative positions of the probe 6 and magnetised element 1 in the direction Y.

O is the centre of rotation in the case where a direction is a rotation, O' is the middle of the external surface of the magnetised element, $\overrightarrow{O'O}$ is zero in the case where the two directions are translations but $O'O=R_{ext}\overline{n}$ in the other cases with $R_{ext}$ being the external radius of the magnetised element. M is the point where the magnetosensitive elements are grouped together in the probe (6) and A is the projection of M along the normal vector $\vec{n}$ on the external surface of the magnetised element (1). $O(\overline{i},\overline{j},\overline{n})$ is the reference frame used for defining the position of the various points O', A and M. In the case of FIGS. 2a, 2b and 2c, the reference frame is respectively a cylindrical, Cartesian and spherical reference frame where $\vec{n}$ is the normal vector at a point on a surface and $\overline{i},\overline{j}$ the vectors tangential to this surface at this same point. The vector $\overrightarrow{AM}$ is therefore colinear with the vector $\vec{n}$ at A and its norm corresponds to the measurement air gap z0, which is a constant of the sensor. FIGS. 2a, 2b and 2c indicate to us that $\overrightarrow{OM}=R_{ext}\overline{n}+x\overline{i}+y\overline{i}+z_0\overline{n}$. The purpose of the present invention is therefore to determine the pair (X,Y) in order thus to determine the position of the magnetised element (1) with respect to the magnetosensitive elements (2) and (3) of the probe (6) in the two directions oriented by the vectors $\vec{i},\vec{j}$.

In these FIGS. 2a, 2b, 2c, the dimensions of the magnetised element (1) in relation to the reference frames $\overline{i},\overline{j},\vec{n}$ are defined for each configuration. For the case in FIG. 2a, it is a question respectively of the rectilinear length, the angular length and the thickness. For the case in FIG. 2b, it is a question respectively of the length, the width and the thickness. For the case in FIG. 2c, it is a question respectively of the first angular length, the second angular length and the thickness.

Figure 3:
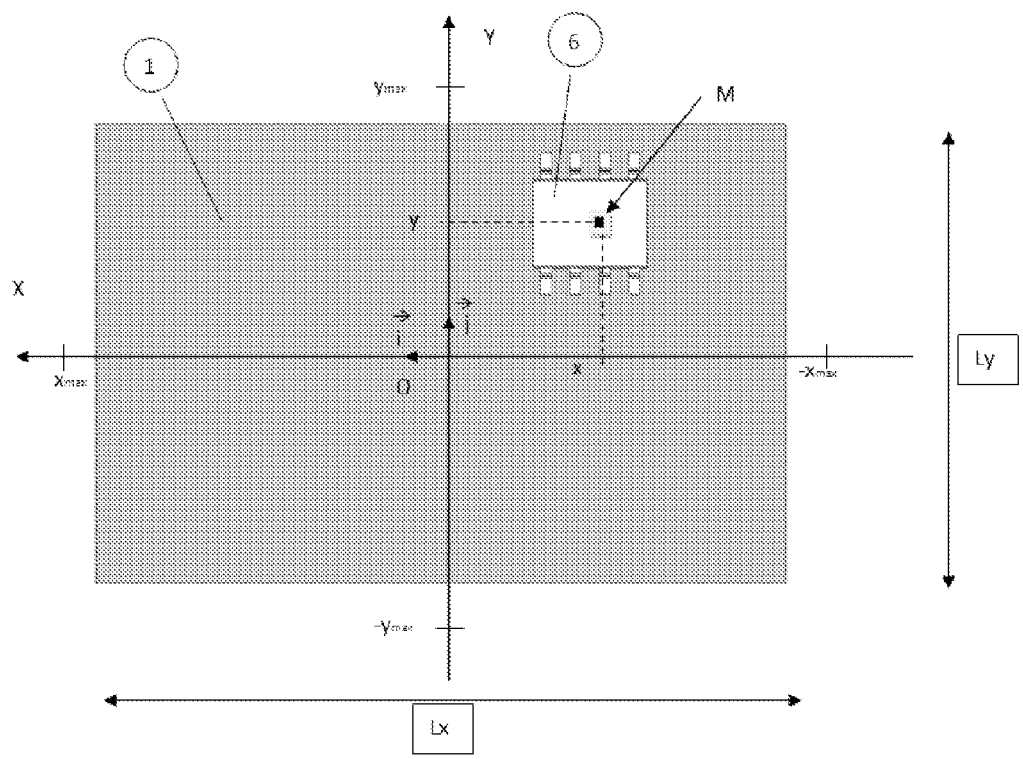
FIG. 3 shows an embodiment where the sensor is composed of a parallelepipedal magnetised element and a probe.

FIG. 3 shows a plan view of an embodiment where the sensor is composed of a parallelepipedal magnetised element (1) of length Lx and width Ly, and of centre O(0,0,0), and a probe (6) capable of measuring at M(x,y,z0) the three components of the magnetic field (Bx, By, Bz) generated by the magnetised element (1) in order to derive therefrom the position (x,y) in the directions X and Y of the element (1) with respect to the probe (6). The travel of the magnetised element (1) along X is (2xmax) and along y is (2ymax) with 2xmax and 2ymax substantially equal to respectively Lx and Ly.

Figure 4:
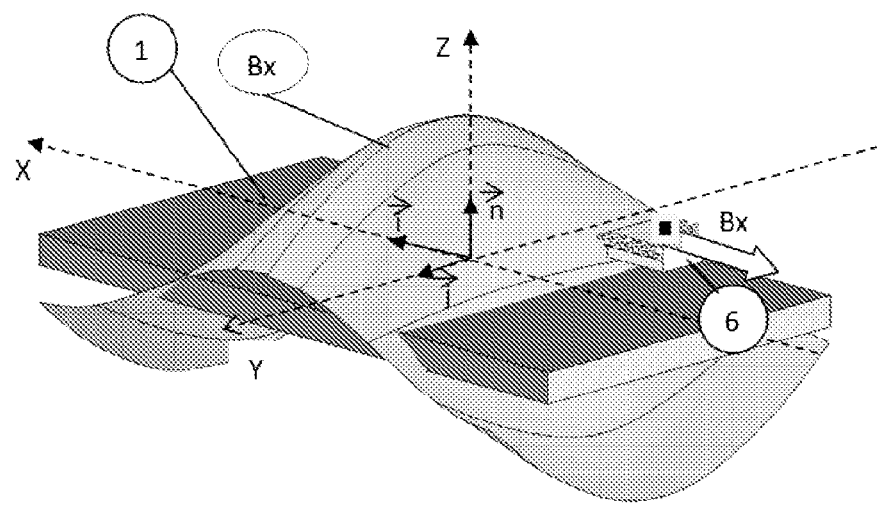
FIG. 4 shows the component Bx of the magnetic field obtained with a magnetisation according to one of the embodiments described by this present invention.

FIG. 4 shows the magnetised element (1), the probe (6) and the component (Bx) of the magnetic field at any point M(x, y,z0) and at a given measurement air gap z0, obtained with a magnetisation of the magnetised element (1) according to one of the embodiments described by this present invention. In this case, the magnetised element (1) generates a magnetic field the component Bx of which varies sinusoidally in its two directions X and Y so that $$Bx(x, y, z_0) = Bx\text{MAX}\cos\left(\frac{2\pi}{Lx}x\right)*\cos\left(\frac{\pi}{Ly}*y\right)*\frac{A}{z_0}.$$

Figure 5:
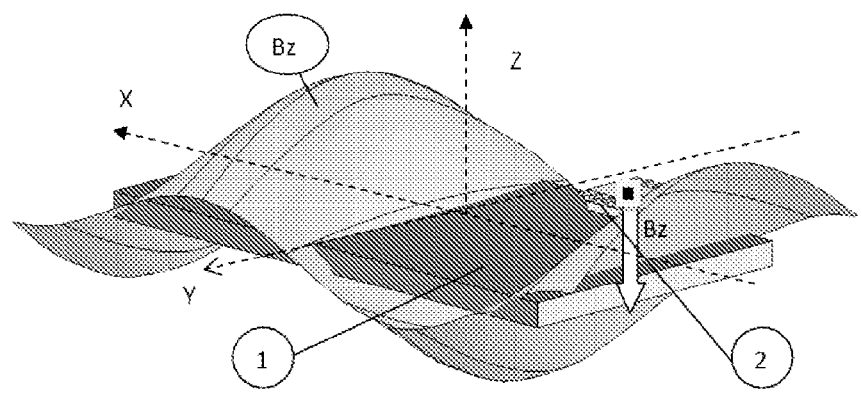
FIG. 5 shows the component Bz of the magnetic field obtained with a magnetisation according to one of the embodiments described by this present invention.

FIG. 5 shows, according to the same configuration as the previous figure, the component (Bz) of the magnetic field at any point (x,y) and with a measurement air gap z0 and which can be written:

$$Bz(x, y, z_0) = Bz\text{MAX}\sin\left(\frac{2\pi}{Lx}x\right)*\cos\left(\frac{\pi}{Ly}*y\right)*\frac{A}{z_0}.$$

Figure 6:
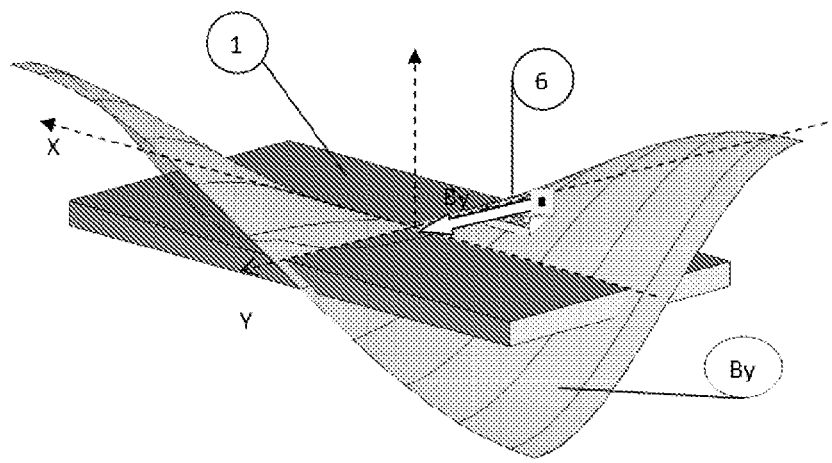
FIG. 6 shows the component By of the magnetic field obtained with a magnetisation according to one of the embodiments described by this present invention.

FIG. 6 shows, according to the same configuration as the two previous figures, the component (Bz) of the magnetic field at any point (x,y) and with a measurement air gap z0 and which can be written:

$$Bz(x, y, z_0) = Bz\text{MAX}*\sin\left(\frac{2\pi}{Ly}*x\right)*\cos\left(\frac{\pi}{\lambda_x}*x\right)*\cos\left(\frac{\pi}{\lambda_x}*y\right)*\frac{A}{z_0}.$$

Figure 7:
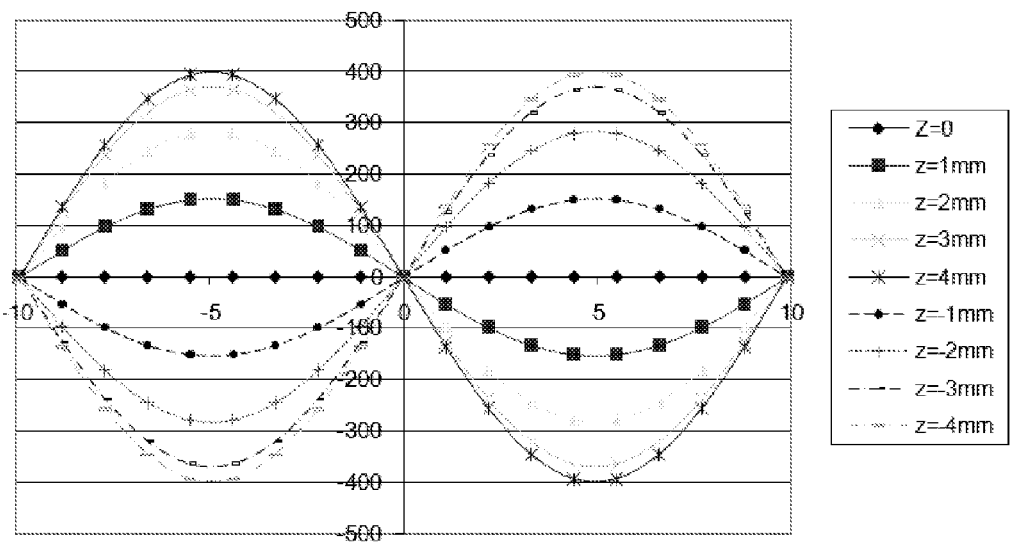
FIG. 7 shows the change along the axis X of the component By of the magnetic field, for several positions y.

FIG. 7 shows the change, in the direction X—in mm—of the component By—in Gauss—of the magnetic field generated by the magnetised element (1) according to one embodiment of the present invention and with a given air gap z0, for 8 positions according to different Ys. In this case xmax=10, ymax=4, Bymax=400, phi=0, λ4=20 and λ2=4 and A=z0.

Figure 8:
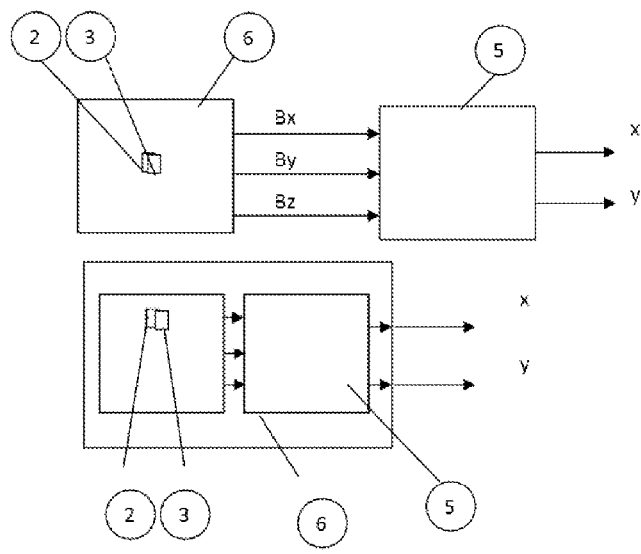
FIG. 8 shows the processing of the magnetic field in order to derive therefrom the two positions in the two directions.

FIG. 8 describes the processing of the field B generated by the magnetised element (1) and measured by the probe (6) which, from at least two of these magnetosensitive elements (2) and (3) that are situated at the same point, make it possible to measure the three components of the magnetic field. Once these three components have been obtained, the processing circuit (5) makes it possible, from algebraic combinations between the components and calculation of angle and modulus, to determine the position along X and Y of the magnetised element with respect to the probe. The processing circuit (5) can be integrated in the probe (6) or be done outside via a microcontroller or an ECU.

Figure 9A:
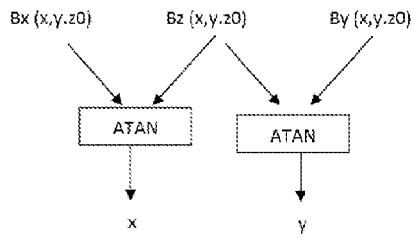
FIGS. 9*a*, 9*b*, 9*c* show various algorithms for postprocessing of the components Bx, By, Bz in order to determine the position x and y of the moving object along X and Y.
Figure 9B:
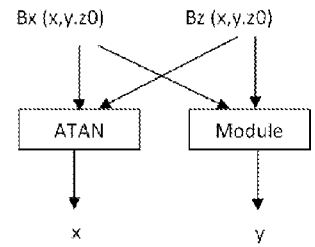
Figure 9C:
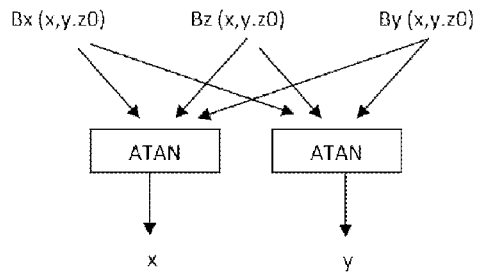

FIGS. 9a, 9b, 9c show different algorithms for postprocessing of the components Bx, By, Bz in order to determine the position of the magnetised element with respect to the probe (6) along X and Y, according to the type of magnetised element and magnetisation chosen. FIG. 9a shows how to use the three components of the magnetic field by calculating A tan (K1Bx/Bz) and A tan (K2By/Bz) in order to determine the position x and y. FIG. 9b shows how to use only two components of the magnetic field by calculating A tan(K1Bx/Bz) and the modulus (root(Bx^2+Bz^2)) in order to determine the position x and y. FIG. 9 shows how to use the three components of the magnetic field by calculating A tan(root((K1Bz)^2+(K2By)^2)/Bx) and A tan(root((K1Bz)^2+(K2Bx)^2)/By) in order to determine the position x and y.

Figure 10:
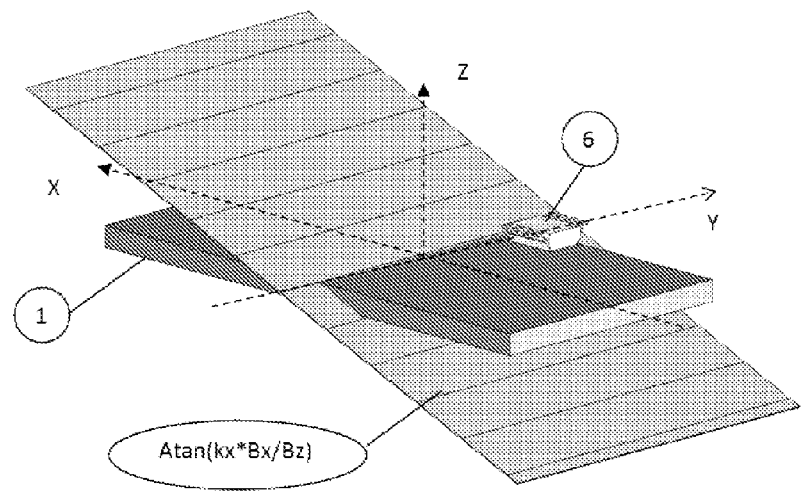
FIG. 10 shows an output signal according to one embodiment of the present invention that makes it possible to determine the position along the direction X independently of the position along Y.

FIG. 10 shows an output signal according to one embodiment of the present invention that makes it possible to determine the position along X independently of the position along Y from the components Bx and Bz of the magnetic field as shown in FIGS. 4 and 5 and using the processing defined in 9a. The output signal is obtained by calculating the arctangent of (Kx*Bx/Bz), which gives a linear output signal along X and independent of Y, whatever the measurement air gap z0, which makes it possible to determine the position of the magnetised element (1) with respect to the probe (6) in its direction X.

According to the same principle, FIG. 11 shows an output signal that makes it possible to determine the position along Y independently of the position along X. The output signal is obtained by calculating the arctangent of (Ky*By/Bz), which gives a linear output signal along Y and independent of X, whatever the measurement air gap z0, which makes it possible to determine the position of the magnetised element (1) with respect to the probe (2) in its second direction Y.

FIG. 12 shows a rectilinear magnetised element (1) of constant thickness and with magnetisation, represented by the vector $\vec{M}$, the direction of which varies linearly in several directions in planes defined by combination of the movement directions X and Y and normal to these directions, that is to say Z. In this figure and all the following figures, a solid arrow in the magnetised element (1) represents a magnetisation direction along the axes $\vec{i}$, $\vec{j}$ or $\vec{n}$ of the reference frame defined in FIG. 2b, a dotted circle represents an outgoing magnetisation direction and a crossed circle represents an incoming magnetisation direction. As can be seen, the field lines thus defined in the magnetised element (1) are non-colinear, which constitutes one of the basic principles of the said invention and makes it possible to generate components of the magnetic field such as those in FIG. 4 or 5 or 6 but with phi=pi/2 and whatever the dimensions of the magnetised element.

FIG. 13 is a perspective view of a tile magnet (1) of constant thickness and with magnetisation, represented by the vector $\vec{M}$, the direction of which varies linearly in several directions in planes defined by combination of the movement directions X and Y and normal to these directions, that is to say Z. As can be seen, the field lines thus defined in the magnetised element (1) are non-colinear, which constitutes one of the basic principles of the said invention and makes it possible to generate components of the magnetic field such as those in FIG. 4 or 5 or 6 but with phi=pi/2 and whatever the dimensions of the magnetised element. In this case X is a rotation direction and Y a translation direction.

Figure 14:
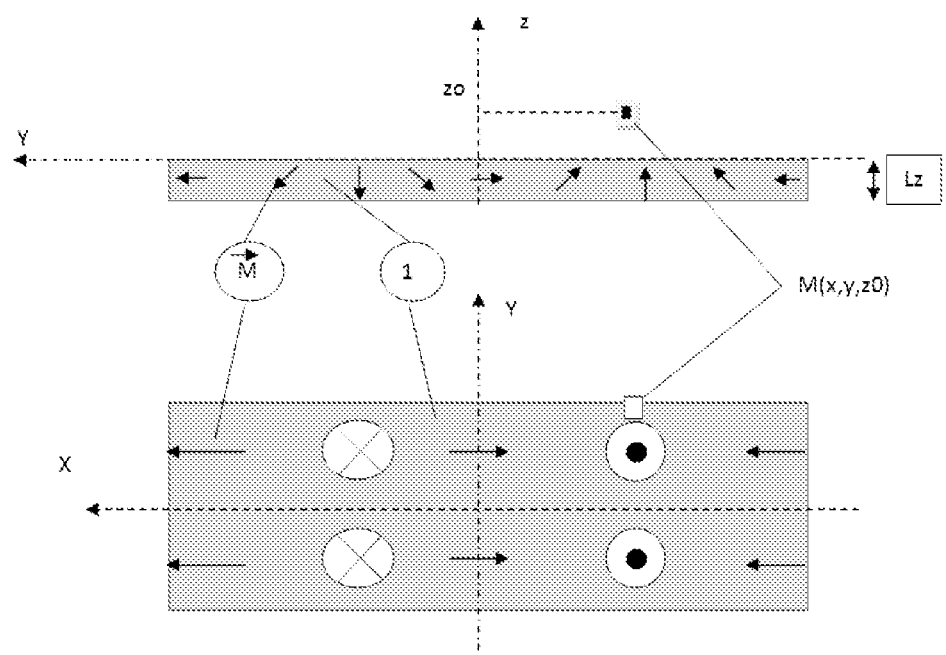
FIG. 14 shows a thin rectilinear magnetised element of constant thickness and a continuous sinusoidal magnetisation in the direction X according to one embodiment of the present invention.

FIG. 14 shows an embodiment applied to a rectilinear magnetised element (1) of constant thickness. According to this particular embodiment, the magnetised element (1) has a magnetisation, represented by the vector $\vec{M}$, the direction of which varies linearly along the length of the magnetised element in a plane defined by the movement direction X and a normal to this direction Z. As can be seen, the field lines in the magnetised element are non-colinear, which constitutes one of the basic principles of the said invention and makes it possible to generate components of the magnetic field such as those in FIGS. 4, 5 and 6 in the case where the width of the magnetised element Ly is small.

Figure 15:
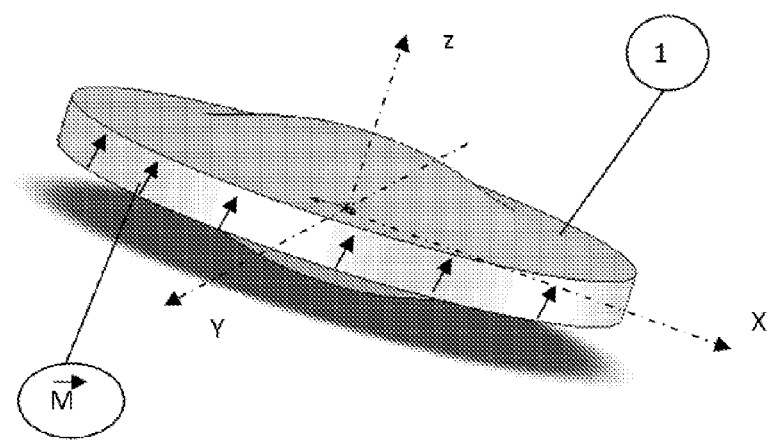
FIG. 15 shows a circular magnetised element of variable thickness quasi-sinusoidally along several directions and magnetised substantially through the thickness.

FIG. 15 shows a circular magnet (1) of thickness variable quasi-sinusoidally along its radii and magnetised substantially across the thickness (direction z). This embodiment makes it possible, whatever the dimensions of the magnet, to generate magnetic fields such that:

$$Bx(x,y,z0)=BxMAX*\cos(2pi/\lambda p*x+phi)*\cos(2pi/\lambda x*y)*A/z0$$

$$By(x,y,z0)=ByMAX*\sin(2pi/\lambda p*x+phi)*\sin(2pi/\lambda*y)*A/z0$$

$$Bz(x,y,z0)=BzMAX*\sin(2pi/\lambda p*x+phi)*\cos(2pi/\lambda*y)*A/z0$$

where phi=pi/2 and $\lambda u$=xmax and $\lambda e$=ymax. Calculation of the arctangent of KxBx/Bz or KyBy/Bz performed by (5) gives a linear signal and gives information on the position of the magnet with respect to the probe along the two axes X and Y.

Figure 16:
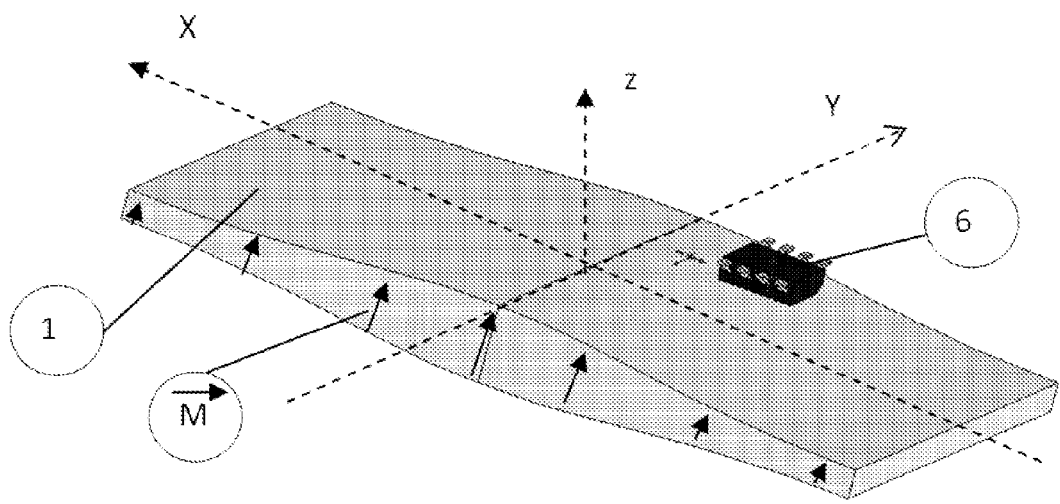
FIG. 16 shows a rectilinear magnetised element with variable thickness quasi-sinusoidally in its direction X and magnetised substantially through its thickness.

FIG. 16 shows a magnetised element (1) having a magnetisation the direction of which is substantially oriented across its thickness but the thickness of which varies quasi-sinusoidally. According to this embodiment, if the width Ly of the magnetised element (1) is small, the measured components of the magnetic field are such that $$Bx(x,y,z0)=BxMAX*\cos(2pi/\lambda p*x+phi)*\cos(2pi/\lambda x*y)*A/z0$$

$$By(x,y,z0)=ByMAX*\sin(2pi/\lambda p*x+phi)*\sin(2pi/\lambda*y)*A/z0$$

$$Bx(x,y,z0)=BzMAX*\sin(2pi/\lambda p*x+phi)*\cos(2pi/\lambda*y)*A/z0$$

where phi=pi/2 and $\lambda h$=xmax and $\lambda e$=ymax. Calculation of the arctangent of KxBx/Bz or KyBy/Bz performed by (5) gives a linear signal and gives information on the position of the magnet (1) with respect to the probe (6) along the two axes X and Y.

FIG. 17 shows a magnet (1) the thickness of which varies discontinuously along Y and which has a sinusoidal magnetisation along X. At a large air gap between the magnetised element and probe (6), the components of the magnetic field become continuous again and we can calculate the arctangent of KxBx/Bz and the modulus of (Bx+Bz) in order to derive therefrom the position of the magnetised element (1) with respect to the probe (6) in its two directions X and Y.

FIG. 18 is a side and plan view of a magnetised element (1) the thickness of which is constant and has a magnetisation through its thickness but the amplitude of which is sinusoidal in the direction X. This case is well suited to the use of an anisotropic magnet with regard to the magnetised element (1). Anisotropy across the thickness makes it possible to have magnets having a higher remnant induction. Given that, in this case, we have no variation in magnetisation in the direction Y, this case functions in the case where the anisotropic magnet is narrow, profiting from the edge effects.

FIG. 19 is a perspective view of a magnetised tile element (1) of constant thickness and a diametral magnetisation where the direction X is a rotation and the direction Y is a translation. This diametral magnetisation corresponds well to a magnetisation direction that is variable with respect to the thickness and in this case in the direction X. Given that in this case we have no variation in magnetisation in the direction Y, this case functions in the case where the magnetised element (1) is narrow, acting on the edge effect. It is also possible, for this case, to use a diametrically anisotropic magnet.

Figure 20:
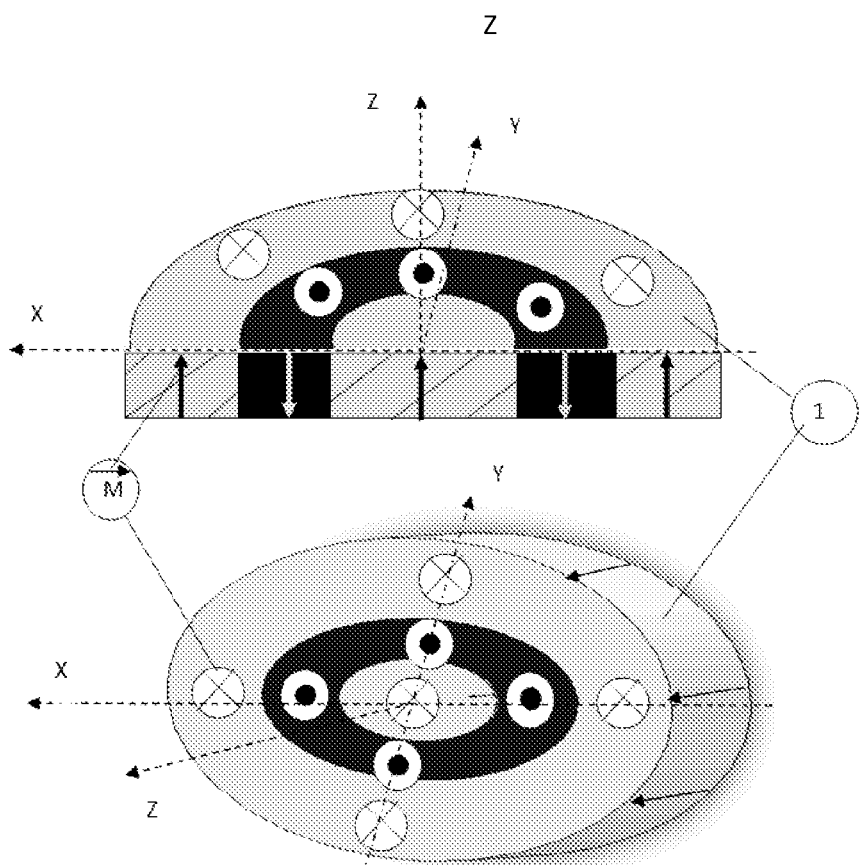
FIG. 20 is a view in section and perspective of an elliptical magnetised element of constant thickness that has an alternation of north-south magnetisation in the directions X and Y.

FIG. 20 shows a view in section and perspective of an elliptical magnetised element (1) of constant thickness that has a magnetisation along Z and discontinuous with an alternation of North and South magnetisation along the axis X and Y. This magnetisation causes a certain distance of the magnetised element (1) from the components Bx, By, Bz of the magnetic field, as described in FIGS. 4, 5 and 6.

Figure 21:
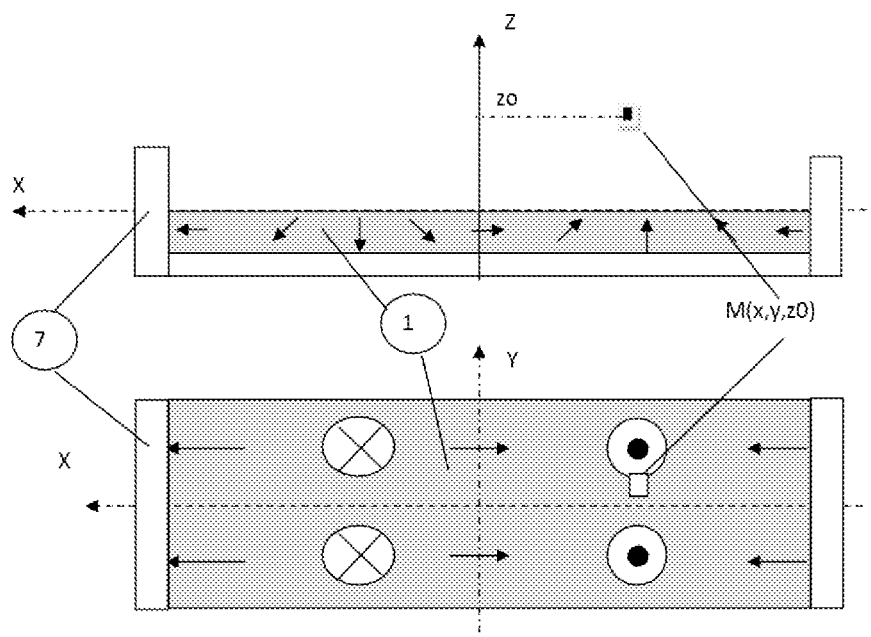
FIG. 21 shows a narrow rectilinear magnetised element of constant thickness and continuous sinusoidal magnetisation in the direction X and a ferromagnetic part connected to the magnetised element that reduces the edge effects.

FIG. 21 shows an embodiment of the magnetisation applied to a rectilinear magnetised element (1) of constant thickness. According to this particular embodiment, the magnetised element (1) has a magnetisation (represented by the vector $\vec{M}$, the direction of which varies linearly along the length of the magnet in a plane defined by the movement direction X and a normal to this direction Z. In addition to the magnetised element, a ferromagnetic part (7) is added in order to increase the field generated by the magnetised element (1) and to reduce the edge effects in the direction X.

As will have been understood by a person skilled in the art from a reading of the present description, the invention concerns a magnetic position sensor making it possible to determine the bidimensional position of a probe 6 able to move with respect to a magnetised element 1, including in the case where the movement of the probe has high amplitude in at least the first of the two movement directions. To do this, the invention can use one or more principles chosen from a set of three principles. The first principle, which can be applied to the determination of the position of the probe in the first dimension or each of the two dimensions of the bidirectional movement, consists of providing the magnetised element with a magnetisation producing a magnetic field that is at least approximately sinusoidal in, respectively, this first dimension or each of the two dimensions.

The second principle, which can only be applied to the determination of the position of the probe in the second dimension of the bidirectional movement and only in the case where the amplitude of the movement in this second dimension is limited, consists of estimating the position of the probe in this dimension and using the measurement of an approximately sinusoidal magnetic field produced by the magnetised element by virtue of an edge effect. The third principle, which can be applied to the determination of the position of the probe in the first dimension or each of the two dimensions of the bidirectional movement, consists of estimating the position of the probe in this first dimension or each of them using the measurement of a magnetic field of variable intensity produced by the magnetised element having a constant magnetisation direction in the first dimension or each of the two dimensions of the bidirectional movement.

This third principle can itself be implemented according to two different modes. The first mode, for example described with reference to FIGS. 15 to 17, consist of giving to the top surface of the magnetised element a sinusoidal or pseudo-sinusoidal form along the first dimension of the movement or each of them, so that the distance between the probe 6 and the top surface of the magnetised element 1 varies according to the position of the probe in respectively the first dimension or each of them. The second mode, for example described with reference to FIG. 18, consists of providing the magnetised element with a magnetisation that varies in intensity in one of the two dimensions of the movement.

The invention claimed is:

1. A magnetic position sensor in at least two directions comprising:
   at least one moveable magnetised element and a probe comprising at least two magnetosensitive elements located substantially at the same point and each of the magnetosensitive elements measuring one of the components of the magnetic field generated by the magnetised element, the magnetised element being moveable relative to the magnetosensitive element, and at least one processing circuit that calculates a plurality of angles and moduli from algebraic combinations of the components of the magnetic field and that supplies at least two independent signals representing the position of the magnetised element in respectively each of the two directions;
   the magnetisation vector of the magnetised element being variable with respect to the vector normal to the surface of the magnetised element disposed opposite the probe on at least a first one of the dimensions of the magnetised element so as to define a position of the probe vis-à-vis the magnetised element in the first dimension.

2. The magnetic position sensor according to claim 1, wherein the direction of the magnetisation vector of the magnetised element is variable in at least one of the dimensions of the magnetised element.

3. The magnetic position sensor according to claim 2, wherein the direction of the magnetisation vector has several periods over the travel measured.

4. The magnetic position sensor according to claim 1, wherein one of the dimensions of the magnetised element is variable in at least one of the two directions causing a variation in the direction of the normal vector.

5. The magnetic position sensor according to claim 4, wherein the dimension varies according to a discontinuous function.

6. The magnetic position sensor according to claim 4, wherein the dimension of the magnetised element varies substantially according to a sinusoidal function.

7. The magnetic position sensor according to claim 1, wherein the amplitude of the magnetisation vector of the magnetised element is variable in at least one of the two directions.

8. The magnetic position sensor according to claim 1, wherein the direction of the magnetisation vector is constant and its amplitude varies sinusoidally in at least one of the two directions.

9. The magnetic position sensor according to claim 1, wherein the magnetisation vector of the magnetised element has at least one alternation in direction in at least one of the two directions.

10. The magnetic position sensor according to claim 1, wherein the signal processing circuit makes at least two arctangent calculations.

11. The magnetic position sensor according to claim 1, wherein the signal processing circuit makes at least one arctangent calculation and one modulus calculation.

12. The magnetic position sensor according to claim 1, wherein the calculation of the position in at least one direction is made by an arctangent calculation of the ratio of two components of the magnetic field after having applied a correction coefficient between these two components.

13. The magnetic position sensor according to claim 1, wherein the processing circuit is integrated with the magnetosensitive elements in a single component.

14. The magnetic position sensor according to claim 1, wherein the magnetised element includes a permanent magnet and at least one ferromagnetic part.

15. The magnetic position sensor according to claim 1, wherein the components of the magnetic field measured vary substantially sinusoidally in each of the at least two directions.

16. A magnetic position sensor comprising:
   a magnetised element spanning a first dimension that generates a magnetic field having a magnetisation vector defined by at least two components including a first component and a second component;
   a probe having a plurality of magnetosensitive elements including a first magnetosensitive element and a second magnetosensitive element, the plurality of magnetosensitive elements being located substantially at the same location;
   the magnetised element being part of a transmission and moveable in a first direction and in a second direction relative to the first magnetosensitive element and the second magnetosensitive element wherein the first magnetosensitive element measures the first component of the magnetic field generated by the magnetised element and the second magnetosensitive element measuring the second component of the magnetic field generated by the magnetised element;

the magnetised element having a surface that is located opposite the probe and that defines a normal vector that is transverse to the surface of the magnetised element;

the magnetisation vector of the magnetised element being variable with respect to the normal vector along the first dimension so as to define a position of the probe with respect to the magnetised element in the first dimension; and at least one processing circuit that calculates a plurality of angles and moduli from combinations of at least the first component and the second component of the magnetic field and that supplies at least two independent signals representing at least one position of the magnetised element with respect to both the first direction and the second direction wherein the first direction is different than the second direction.

17. A magnetic position sensor comprising: a magnetised element extending along a first dimension that generates a magnetic field having a magnetisation vector defined by at least two components; a probe having at least two magnetosensitive elements that are located substantially at the same location; the magnetised element being moveable in at least two different directions relative to the magnetosensitive elements wherein one of the magnetosensitive elements measures one component of the magnetisation vector and another one of the magnetosensitive elements measures another component of the magnetisation vector; the magnetised element having a surface that is located opposite the probe and that defines a normal vector that is transverse to the surface of the magnetised element; the magnetisation vector of the magnetised element being variable with respect to the normal vector along the first dimension so as to define a position of the probe with respect to the magnetised element in the first dimension; at least one circuit that operably calculates at least a plurality of angles and moduli from combinations of the at least two components of the magnetisation vector and that supplies at least two independent signals representing at least one position of the magnetised element with respect to the at least two different directions.

18. The magnetic position sensor of claim 17, wherein the at least two different directions include a rotational direction and a translational direction.

19. The magnetic position sensor of claim 17, wherein the at least two different directions include a first translational direction and a second translational direction that is different from the first translational direction.

20. The magnetic position sensor of claim 17, wherein the at least two different directions include a first rotational direction and a second rotational direction that is different from the first rotational direction.

* * * * *